United States Patent [19]

Kostelezky

[11] Patent Number: 4,586,685
[45] Date of Patent: May 6, 1986

[54] PARACHUTE

[76] Inventor: Peter Kostelezky, Reutebühlstrasse 41, D-7987 Weingarten, Fed. Rep. of Germany

[21] Appl. No.: 536,642

[22] Filed: Sep. 28, 1983

[30] Foreign Application Priority Data

Oct. 2, 1982 [DE] Fed. Rep. of Germany ....... 3236533

[51] Int. Cl.[4] ............................................. B64D 17/02
[52] U.S. Cl. ................................................... 244/145
[58] Field of Search ............... 244/142, 145, 147, 149, 244/152, 139

[56] References Cited

U.S. PATENT DOCUMENTS

| | | | |
|---|---|---|---|
| 2,562,799 | 7/1951 | Kowalski | 244/145 |
| 2,673,051 | 3/1954 | Frost | 244/139 |
| 2,701,697 | 2/1955 | Ewing | 244/145 |
| 2,724,567 | 11/1955 | Adams . | |
| 2,770,432 | 11/1956 | Stevinson . | |
| 2,925,971 | 2/1960 | Istel et al. | 244/145 |
| 2,949,266 | 8/1960 | Sepp, Jr. | 244/145 |
| 3,350,040 | 10/1967 | Sims et al. | 244/145 |
| 4,270,714 | 6/1981 | Jalbert | 244/152 |

FOREIGN PATENT DOCUMENTS 3020999 12/1980 Fed. Rep. of Germany .

*Primary Examiner*—Galen L. Barefoot
*Attorney, Agent, or Firm*—Spencer & Frank

[57] ABSTRACT

In a parachute having a cap made of elongate, radially arranged cloth panels (6, 7) which are sewn together along their longitudinal edges, with the parachute being intended to rotate about its center axis during its descent, it is difficult to attach nozzle openings which direct the outgoing air in a tangential direction. A particularly simple parachute cap results if the cloth panels (6, 7) are cut asymmetrically in such a manner that they have side edges of different lengths and partial sections of the cloth panels, in their longitudinal extent, are left unsewn so as to form nozzle-shaped air exit openings (9) having curved edge regions (8). The cut piece of cloth may have the shape of a trapezoid with a scalene triangle attached to its base. Weights (12) may be attached in the edge region of the air exit openings (see attached Figure).

12 Claims, 3 Drawing Figures

PARACHUTE

BACKGROUND OF THE INVENTION

The invention relates to a parachute having a cap made of elongate, radially arranged cloth panels whose longitudinal sides are sewn together.

In this classical manner of parachute construction, the side edges of the cloth panels may be rounded, resulting in a spherical pattern, or they may form a train of polygons. In any case, however, the pattern of the cloth panels is symmetrical to a linear center axis. In many known parachutes, the cap is divided into a supporting zone and a guide zone which follows toward the bottom after the largest cap diameter. This guide zone may be comprised, for example, of individual guide faces which are inclined with respect to the axis of the parachute, it may be curved inwardly as a simple extension of the cap curvature, or it may have the shape of the generated surface of a cone frustum. It is known that the guide zone serves the purpose of imparting a stable descent behavior to the parachute and to attenuate pendulum oscillations of the parachute load system if there is a change in air flow (a sudden gust of wind).

It is also known to provide parachutes with openings from which the air escapes more or less tangentially so that during descent the parachute rotates about its axis. However, in all prior art designs of rotating parachutes, there exists the special problem of deflecting the exiting air into the tangential direction. To effect this, it is often necessary to employ pieces of cloth cut according to a particularly complicated pattern which are specially attached to the parachute itself to provide air guidance and constitute a considerable manufacturing cost factor.

SUMMARY OF THE INVENTION

It is the object of the invention to design a parachute of the above identified type so that, when jettisoned, it reaches a noticeable rate of rotation while having a simple shape and being economical to produce.

This is accomplished by the invention in that the cloth panels are cut asymmetrically in such a manner that they have side edges of different lengths and that, in a partial section (CD) of their longitudinal extent, the cloth panels are left unsewn so as to form nozzle-shaped air exit openings having curved edge regions.

When assembling the cloth panels, their pattern axes are stretched and placed perpendicularly to their transverse edge which forms the basic edge of the cap so that a precurved region is formed, similar to a cornet bag, if the long side edge of the one cloth panel is sewn to the short side edge of the adjacent cloth panel. This bag-like region acts like a turbine blade: it deflects the air toward the exit opening where the air exits, albeit not exactly tangentially but still with a considerable tangential component. The shape and size of the "nozzles" as well as their position in the region of the largest cap diameter produce a torque and a correspondingly rapid rotation of the parachute.

The invention can be employed for parachutes whose cap has only one supporting zone and possibly even a relatively flat supporting zone, and also can be employed for parachutes with a more stable descent and a drawn-in guide zone. In a parachute of this latter type, it is proposed, as a particularly suitable embodiment, for the guide zone section of the cloth panel to form an isosceles trapezoid and the supporting zone section of the cloth panel to form, for example, a scalene triangle, possibly with a slightly outwardly bent or curved long side and possibly with one vertex cut off, the bases of the trapezoid and of the triangle touching one another. By sewing such cloth panels into the centrally symmetrical parachute assembly, the supporting zone section is rotated about the point of intersection of the short side of the triangle with the common base, and thus the panel surface area necssary to form the outwardly curved blowout nozzle is obtained.

If the parachute is to have a central peak opening, it is possible, as mentioned above, to take away the tip of the cap section of the individual cloth panels. The orientation of the threads also depends on the desired characteristics of the parachute. To form a particularly rotationally effective air exit opening, it may be of advantage to have warp and weft threads extent at an angle to the longitudinal axis of the cloth panels, particularly under an angle of 45°. Moreover, weights, which upon rotation of the parachute exert a centrifugal force, may be attached in the edge regions of the air exit openings so as to contribute to an improved outflow of air.

Finally, it should be pointed out that the nozzle-like air exit openings need not lie exclusively in the supporting zone of the cap but may advantageously also extend into the guide zone. This presses them even further radially outwardly. Otherwise, the interface between supporting zone and guide zone is fluid, due to changes in dynamic pressure.

BRIEF DESCRIPTION OF THE DRAWINGS

One embodiment of the invention will now be explained with the aid of the drawings wherein.

DETAILED DESCRIPTION OF PREFERRED EMBODIMENT

Figure 1:
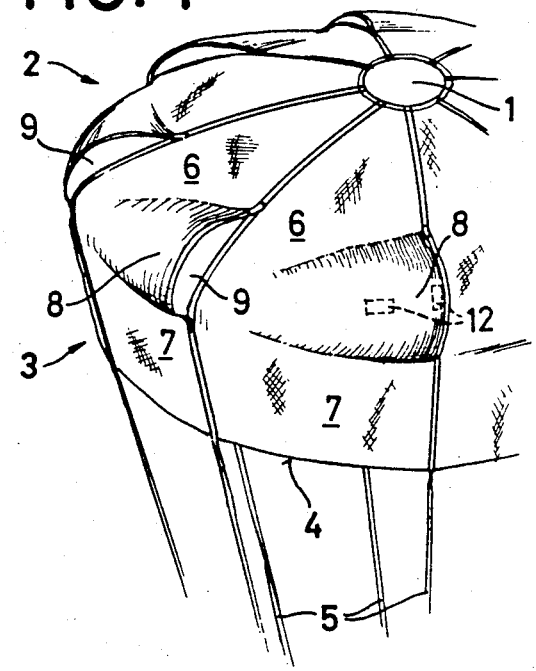
FIG. 1 is a spatial illustration of part of a parachute equipped with rotation nozzles according to the invention.

In the parachute cap of FIG. 1, which is shown fully opened, one distinguishes a supporting zone 2 (upper cap section) and a guide zone 3, which is terminated at the bottom with a base edge 4 having a smaller diameter. The rigging 5 is brought alongside each left edge of the cloth panel up to opening 1 and is sewn over its entire length to the respective cloth panels, the seam simultaneously constituting the connecting seam with the adjacent cloth panel. Each cloth panel comprises a supporting zone section 6 and a guide zone section 7 and, in the region of the supporting zone section, has a bulge 8 which increases in size from the left to the right and ends in an opening 9 at the right. Opening 9 is surrounded, on the one hand, by the free, unsewn edge of the cloth panel following on the right and, on the other hand, by the unsewn edge of the cloth panel forming the respective bulge 8. Because of the special outline of the cloth panels, a larger edge length is available at their respective right sides.

Figure 2:
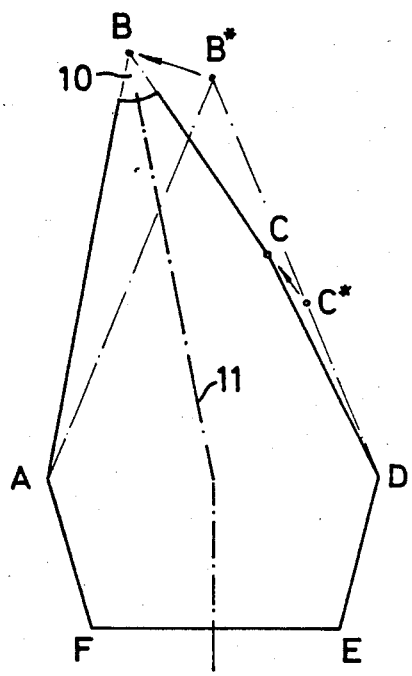
FIG. 2 shows the outline of the parachute cloth panel of FIG. 1, spread out flat.

In FIG. 2, the corner points of the cut pieces or panels of cloth are marked with the letters A through F. Guide zone section ADEF forms an isosceles trapezoid, while supporting zone section ABD is essentially a scalene triangle which has the same base AD as the trapezoid. A sector-shaped vertex section 10 has been taken away to form opening 1 and remains unconsidered in the contemplations below. The imaginary vertex B of the triangle forms the center of opening 1. The pattern axis 11 of this piece extends from vertex B to the center of base AD and continues as the center axis of the trapezoid.

The cut piece shown in FIG. 2 was produced by rotating an imaginary isosceles triangle AB*D, shown in dot-dash lines, about point A. Point C*, which lies between B* and D, has thus moved toward C and point B* has moved toward B. Edge CD forms part of the circumference of opening 9. It can easily be seen that, due to the rotation, the right-hand edge of supporting zone section BCD has become longer approximately by path CC* than edge B*D of the dot-dash isosceles triangle.

Figure 3:
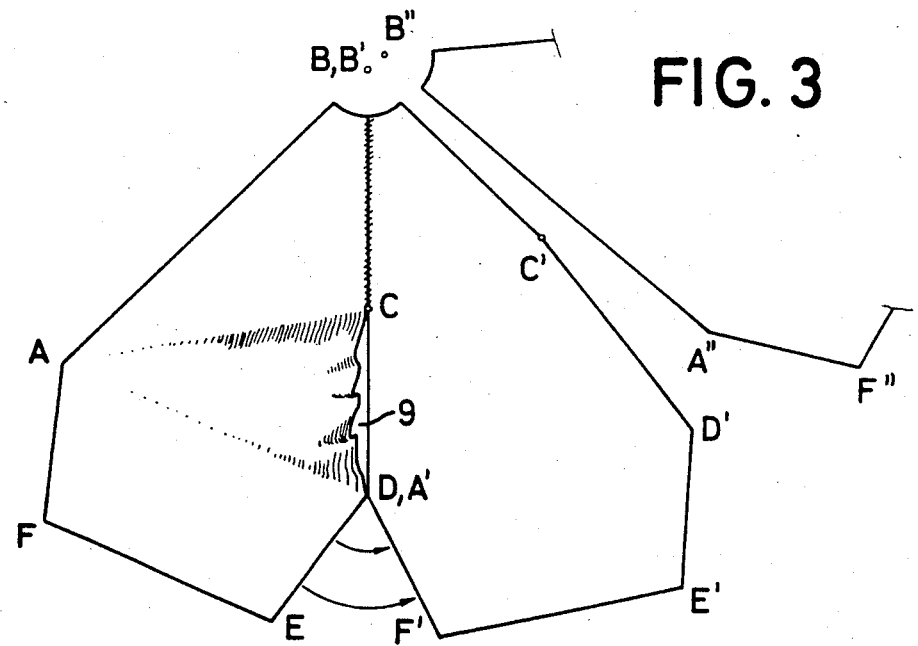
FIG. 3 illustrates two partially sewn together cloth panels according to FIG. 2.

The left-hand portion of FIG. 3 shows what happens if the above-described imaginary rotation of the supporting zone section of FIG. 2 is effected in reality in the opposite direction. Corner point C then comes to lie again on line BD and area ACD curves upwardly in the form of a bag. Path BD is now equal to path B'A' of the adjacent cloth panel. Now the supporting zone sections on line BC and the guide zone sections on line DE or A'F', respectively, are sewn together. Likewise, the second and third cloth panels are sewn together along lines B'C' and D'E' or A"F", respectively.

While the left edge of the supporting zone sections 6 of the individual cloth panels (see FIG. 1) is reinforced continuously by means of a rigging band, the reinforcement of the unsewn right-hand edge section CD, to keep it from tearing, is effected by a separate band. Moreover, special measures to reinforce the material should be taken at the highly stressed points C and D at the ends of opening 9.

As shown in FIG. 1, weights 12 may be attached to the panels in the curved edge region which form the air exit openings 9. Such weights 12 will impart a centrifugal force upon rotation of the parachute and thus contribute to an improved outflow of air from the exit openings 9.

I claim:

1. In a rotating parachute having a cap of elongate, radially arranged cloth panels which are sewn together along their longitudinal sides, and a plurality of air exit openings provided in said cap for imparting a rotational torque to said cap, the improvement wherein: at least a majority of the individual panels of cloth are cut asymmetrically such that their side edges have different lengths; said majority of cloth panels are similarly oriented in said cap; the longer longitudinally extending side edge of each of said majority of panels is adjacent a shorter longitudinally extending side edge of the adjacent panel; in partial sections between the ends of their longitudinal extent, the longer longitudinally extending side edges of said majority of panels of cloth are left unsewn; said unsewn sections of said longer longitudinally extending sides of said panels form said air exit openings which are all oriented to provide a torque in the same rotational direction; and said air exit openings are nozzle-shaped with curved edge regions when said cap is inflated.

2. A parachute according to claim 1 whose cap has a supporting zone, which extends from the peak to the region of said cap having the largest diameter, and a subsequent drawn-in guide zone, and wherein said the guide zone sections of the cloth panels form an isosceles trapezoid and the supporting zone sections of the cloth panels form a triangle, with the bases of said trapezoid and said triangle touching one another.

3. Parachute according to claim 1, wherein respective weights are attached to the curved edge region of the respective said air exit openings to impart a centrifugal force upon rotation of said cap.

4. A parachute as defined in claim 2 wherein said supporting zone sections of said majority of panels each form a scalene triangle having a slightly outwardly bent or curved longer longitudinally extending side edge.

5. A parachute as defined in claim 4 wherein the vertex of said scalene triangle adjacent said peak of said cap is cut off.

6. A parachute as defined in claim 2 wherein said supporting zone sections of said majority of panels each form a scalene triangle whose vertex is adjacent said peak of said cap is cut off.

7. A rotating parachute as defined in claim 1 wherein said majority of the individual panels comprises all of said individual panels.

8. In a rotating parachute having a cap of elongate, radially arranged cloth panels which are sewn together along their longitudinal sides, the improvement wherein: all of the individual panels of cloth are cut asymmetrically such that their side edges have different lengths, with the straight line distance between the ends of said panels along their longer longitudinally extending side being longer than the straight line distance between the ends of said panels along their shorter longitudinally extending side; said panels are sewn together so that the shorter longitudinal side edge of one panel is sewn to the longer side edge of the adjacent panel; in partial sections between the ends of their longitudinal extend, the longitudinally extending side edges of said panels of cloth are left unsewn; and said unsewn sections of the longer longitudinally extending sides of said panels form nozzle-shaped air exit openings having curved edge regions when said cap is inflated.

9. A parachute as defined in claim 8 wherein said panels are sewn adjacent said peak of said cap and are unsewn adjacent the region of said cap which has the largest diameter.

10. A parachute as defined in claim 9 wherein said panels have the shape of a scalene triangle between said peak and said region of largest diameter.

11. A parachute as defined in claim 9 wherein said panels, between said peak and said region of largest diameter, have the shape of a scalene triangle with the vertex adjacent said peak of said cap cut off, whereby said cap has a circular opening at said peak.

12. A parachute as defined in claim 9 wherein said panels, between said peak and said region of largest diameter, have the shape of a scalene triangle having a slightly outwardly bent or curved longer longitudinal side edge.

* * * * *